E. R. SEXTONE.
FORM GAGE.
APPLICATION FILED NOV. 23, 1908.
938,280.
Patented Oct. 26, 1909.
2 SHEETS—SHEET 1.
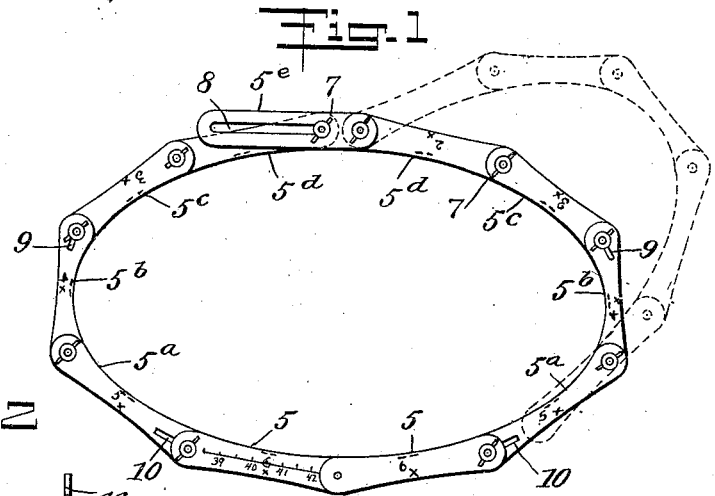
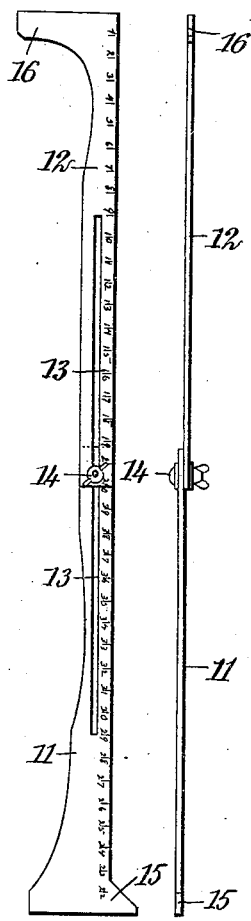
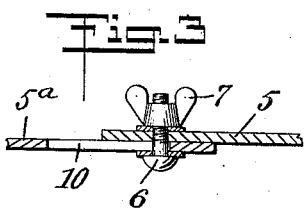
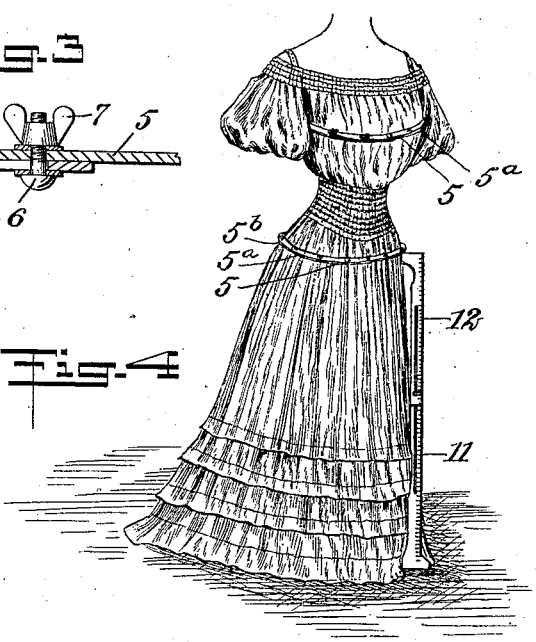
WITNESSES
F. D. Sweet
W. W. Holt
INVENTOR
Edith R. Sextone
BY Munn & Co.
ATTORNEYS

E. R. SEXTONE.
FORM GAGE.
APPLICATION FILED NOV. 23, 1908.

938,280.

Patented Oct. 26, 1909.
2 SHEETS—SHEET 2.

WITNESSES

INVENTOR
Edith R. Sextone
BY
ATTORNEYS

UNITED STATES PATENT OFFICE.

EDITH RAY SEXTONE, OF CHICAGO, ILLINOIS.

FORM-GAGE.

938,280.  Specification of Letters Patent.  Patented Oct. 26, 1909.

Application filed November 23, 1908. Serial No. 463,971.

*To all whom it may concern:*

Be it known that I, EDITH RAY SEXTONE, a citizen of the United States, and a resident of Chicago, in the county of Cook and State of Illinois, have invented a new and Improved Form-Gage, of which the following is a full, clear, and exact description.

The invention has for its purpose a gage suitable to obtain the shape and measure of different sized and proportioned women, for the construction of bust forms and stands upon which to drape their clothing.

The invention may be defined as consisting of a body gage comprising a series of links with concave edges to conform to the body and pivoted together, with means in connection with certain pivots for securing the links connected thereby against pivotal movement after the gage is adjusted about the body, and a height gage for determining the elevation of the body gage when circumferentially applied. The curvature or concavity of the edges of the links of the body gage is greater at one side than at the other, whereby the exact form of different sized women may be approximately arrived at by reversing the gage, and using the edges of the links having the greatest curvature for the small sizes, and the opposite edges of the links for the large sizes.

Reference is to be had to the accompanying drawings forming a part of this specification, in which similar characters of reference indicate corresponding parts in all the views.

Figure 5:
Figure 6:
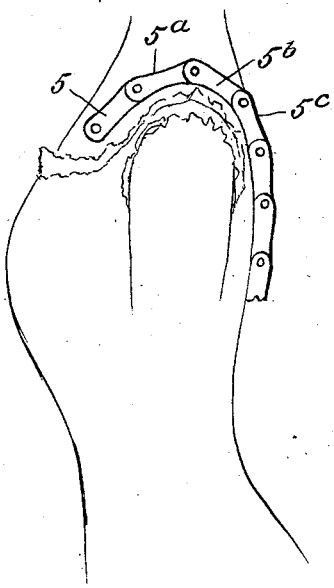

Figure 1 is a plan of my improved body gage with the end links brought together and connected; Fig. 2 is an elevation and an edge view of the height gage; Fig. 3 is a vertical section on an enlarged scale through the pivotal connection of one of the links of the body gage; Fig. 4 illustrates certain applications of the gages to the body; Figs. 5 and 6 illustrate the application of the gages to the body in respectively determining the shape of the top of the shoulder and the shape of the shoulder from front to rear; and Fig. 7 is a face view of a modified form of gage link.

The body gage is composed of a series of links overlapping at the ends and pivoted together by bolts 6, the latter being provided with thumb-nuts 7 by which they are tightened when the links are to be held against relative pivotal movement. Any number of links may be used in the construction of the gage, but I find it preferable to employ with regard to horizontal measurements, two front links 5, 5, two front side links $5^a$, $5^a$, two side links $5^b$, $5^b$, two rear side links $5^c$, $5^c$, and two rear links $5^d$, $5^d$, with an additional rear link $5^e$ for connecting the rear links together, and which is shown to be provided with a longitudinal slot 8, in which its pivot bolt is slidable in order that the gage may be expanded and contracted. The side links $5^b$ and the front side links $5^a$ are longitudinally slotted at the ends farthest removed from each other for a like purpose, as respectively indicated at 9 and 10. Ordinarily there will be no connection between the front links 5, 5, but one of these links will be graduated to indicate different circumferential measurements. All of the links with the exception of the link $5^e$ have concave side edges, with the curvature at one edge greater than at the other, whereby the gage may be reversed in using it for forms of different sizes. This curvature will be greater for the links $5^b$ and the adjacent links $5^a$ and $5^c$. The object in thus fashioning the edges of the links is obviously to give a substantial bearing on the body for their entire length, whereby the shape may be correctly arrived at.

Figure 7:
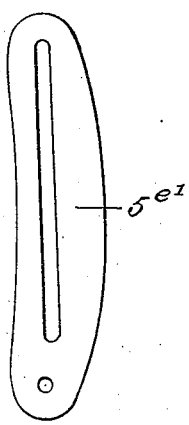

In Fig. 7 I have shown a link $5^{e'}$ designed as a substitute for the link $5^e$ in taking the curvature of the shoulder over the arm, as illustrated in Fig. 5. The link $5^{e'}$ is in all respects the same as the link $5^e$ except that it is provided with concave and convex opposite side edges.

In connection with the body gage it is necessary that a height gage be used, preferably such as illustrated in Figs. 2 and 4, wherein is shown such a gage consisting of two overlapping members 11 and 12 respectively, suitably graduated and having longitudinal registering slots 13 through which passes a set-bolt 14 for rigidly securing the members in adjusted position. The lower member 11 has a foot 15 for giving it a substantial support, and the upper member 12 has an inwardly-projecting finger 16 on the upper edge of which is adapted to rest the circumferential gage.

In constructing a form on which the clothes are draped, the body gage is circumferentially applied to the body at suitable elevations, such as the hips, waist and bust, and the elevation of these points above the floor or other surface is determined by the height gage. In applying the body gage circumferentially, the pivot-bolts are loosened in order that the links may freely turn on each other, after which the opposite side portions of the gage are separated at the front links 5, 5, as illustrated in dotted outline in Fig. 1. The edges of the links are adopted which have the curvature most closely conforming to the body to be measured, and the adjustment of the gage is effected by pressing all of the links close to the body. On then tightening the thumbnuts and noting the point at which the end of one of the front links falls on the adjacent graduated link, the two half portions of the gage are swung apart on the pivot of one of the rear links $5^d$. By again bringing the links 5, 5, together to the same extent as noted by the graduations, the exact shape of the body at the elevation at which the measurement is taken, is given. The gage in whole or in part may be applied on any curve of the body, as for example, as shown in Figs. 5 and 6, and the contour thereof correctly determined, enabling the accurate construction of the form. If necessary to obtain a curve, the relative positions of the links may be shifted from that shown in Fig. 1.

Having thus described my invention, I claim as new and desire to secure by Letters Patent:

A body gage, consisting of a series of links pivoted together, the edges of the links at one side concave for certain body sizes, and the edges of the links at the opposite side having a different concavity for other body sizes.

In testimony whereof I have signed my name to this specification in the presence of two subscribing witnesses.

EDITH RAY SEXTONE.

Witnesses:
SAMUEL E. MARSH,
EVA L. MARSH.